(12) United States Patent
Birks et al.

(10) Patent No.: US 7,106,932 B2
(45) Date of Patent: Sep. 12, 2006

(54) METHOD AND APPARATUS RELATING TO OPTICAL FIBERS

(75) Inventors: Timothy Adam Birks, Bath (GB); Jonathan Cave Knight, Wellow (GB); Philip St. John Russell, Bath (GB); Brian Joseph Mangan, Bath (GB)

(73) Assignee: Crystal Fibre A/S, Birkerod (DK)

( * ) Notice: Subject to any disclaimer, the term of this patent is extended or adjusted under 35 U.S.C. 154(b) by 160 days.

(21) Appl. No.: 10/476,825

(22) PCT Filed: May 3, 2002

(86) PCT No.: PCT/GB02/02060

§ 371 (c)(1), (2), (4) Date: May 7, 2004

(87) PCT Pub. No.: WO02/090277

PCT Pub. Date: Nov. 14, 2002

(65) Prior Publication Data

US 2004/0175082 A1   Sep. 9, 2004

(30) Foreign Application Priority Data

May 4, 2001   (GB) .................. 0111055.0

(51) Int. Cl.
*G02B 6/02*   (2006.01)
*C03B 37/01*  (2006.01)

(52) U.S. Cl. .................. 385/123; 65/385; 65/406
(58) Field of Classification Search ........ 385/123–128; 65/385, 406
See application file for complete search history.

(56) References Cited

U.S. PATENT DOCUMENTS

| | | | |
|---|---|---|---|
| 4,799,949 A | 1/1989 | Keck et al. | |
| 4,948,217 A | 8/1990 | Keck et al. | |
| 5,268,979 A | 12/1993 | Weidman | |
| 5,627,934 A | 5/1997 | Muhs | |

FOREIGN PATENT DOCUMENTS

| | | |
|---|---|---|
| EP | 0438876 | 7/1991 |
| JP | 56102809 | 8/1981 |
| WO | WO 00/49435 | 8/2000 |

OTHER PUBLICATIONS

Birks, et al., "All-fiber Polarized Based on a Null Taper Coupler", Optics Letters, vol. 20, No. 12, Jun. 15, 1995, pp. 1371-1373.

(Continued)

*Primary Examiner*—Sarah Song
(74) *Attorney, Agent, or Firm*—Buchanan Ingersoll & Rooney PC (57) ABSTRACT

A method of joining a first optical fiber (110) to a second optical fiber (130) comprises the steps of: (i) providing a preform element (10) comprising material defining a primary elongate cavity (40); (ii) inserting the first optical fiber (110) into the primary cavity (40) to form a preform (125); and (iii) drawing the second optical fiber (130) from the preform (125); wherein, the second optical fiber (130) includes a core region comprising material that has been drawn from the first optical fiber (110).

67 Claims, 3 Drawing Sheets

OTHER PUBLICATIONS

Birks, et al., "Endlessly Single-Mode Photonic Crystal Fiber", Optics Letters, vol. 22, No. 13, Jul. 1, 1997, pp. 961-963.

Birks, et al., "2 × 2 Single-Mode Fiber Routing Switch", Optics Letters, vol. 21, No. 10, May 15, 1996, pp. 722-724.

Chandalia et al., "Adiabatic Coupling in Tapered Air-Silica Microstructured Optical Fiber", IEEE Photonics Technology Letters, vol. 13, No. 1, Jan. 2001, pp. 52-54.

Cregan, et al., "Single-Mode Photonic Band Gap Guidance of Light in Air", Science, vol. 285, Sep. 3, 1999, pp. 1537-1539.

Culverhouse, et al., "3 × 3 All-Fiber Routing Switch", IEEE Photonics Technology Letters, vol. 9, No. 3, Mar. 1997, pp. 333-335.

Ferrando, et al., "Designing a Photonic Crystal Fibre with Flattened Chromatic Dispersion", Electronics Letters, vol. 35, No. 4, Feb. 18, 1999, pp. 325-327.

Gnauck, et al., "Dispersion and Dispersion-slope Compensation of NZDSF over the Entire C Band using Higher-Order-Mode Fibre", Electronics Letters, vol. 36, No. 23, Nov. 9, 2000, pp. 1946-1947.

Knight, et al., "All-Silica Single-Mode Optical Fiber with Photonic Crystal Cladding", Optics Letters, vol. 21, No. 19, Oct. 1, 1996, pp. 1547-1549.

Knight, et al., "Large Mode Area Photonic Crystal Fibre", Electronics Letters, vol. 34, No. 13, Jun. 25, 1998, pp. 1347-1348.

Love, et al., "Tapered Single-Mode Fibres and Devices, Part 1: Adiabaticity Criteria", IEE Proceedings-J, vol. 138, No. 5, Oct. 1991, pp. 343-354.

Love, et al., "Quantifying Loss Minimisation in Single-Mode Fibre Tapers", Electronics Letters, vol. 22, No. 17, Aug. 14, 1986, pp. 912-914.

Mangan et al., "Experimental Study of Dual-Core Photonic Crystal Fibre", Electronics Letters, vol. 36, No. 16, Aug. 3, 2000, pp. 1358-1359.

Ranka, et al., "Visible Continuum Generation in Air-Silica Microstructure Optical Fibers with Anomalous Dispersion at 800 nm", Optics Letters, vol. 25, No. 1, Jan. 1, 2000, pp. 25-27.

METHOD AND APPARATUS RELATING TO OPTICAL FIBERS

This invention relates to the field of optical fibres.

Single-mode and multimode optical fibres are widely used in applications such as telecommunications. Such fibres are typically made entirely from solid materials such as glass, and each fibre typically has the same cross-sectional structure along its length. Transparent material in one part (usually the middle) of the cross-section has a higher refractive index than material in the rest of the cross-section and forms an optical core within which light is guided by total internal reflection. We refer to such a fibre as a conventional fibre or a standard fibre.

Most standard fibres are made from fused silica glass, incorporating a controlled concentration of dopant, and have a circular outer boundary typically of diameter 125 microns. Standard fibres can be single-mode or multimode. They can have more than one core, and they can be polarisation-maintaining fibres.

Standard fibres are in widespread and routine use and so an established technology of fibre connectors, splices and input/output couplers exists to insert light into and extract light from them efficiently and cost-effectively. It is therefore advantageous for a new design of optical device for telecommunications applications to be made compatible with pre-existing standard fibres.

In the past few years a non-standard type of optical fibre has been demonstrated, called the photonic crystal fibre (PCF) [J. C. Knight et al., Optics Letters v. 21 p. 203]; such fibres have alternatively been called holey fibres or microstructure fibres. Typically, a PCF is made from a single solid material such as fused silica glass, within which is embedded an array of air holes. The holes run parallel to the fibre axis and extend the full length of the fibre. A region of solid material between holes, larger than neighbouring such regions, can act as a waveguiding fibre core. Light can be guided in this core in a manner analogous to total-internal-reflection guiding in standard fibres. One way to provide such an enlarged solid region in a fibre with an otherwise periodic array of holes is to omit one or more holes from the structure. However, the array of holes need not be periodic for total-internal-reflection guiding to take place; we nevertheless refer to such a fibre as a photonic-crystal fibre.

Another mechanism for guiding light in photonic-crystal fibres is based on photonic bandgap effects rather than total internal reflection. For example, light can be confined inside a hollow core (an enlarged air hole) by a suitably-designed array of smaller holes surrounding the core [R. F. Cregan et al., Science v. 285 p. 1537]. True guidance in a hollow core is not possible at all in conventional fibres.

PCFs can be fabricated by stacking glass elements (rods and tubes) on a macroscopic scale into the required pattern and shape, and holding them in place while fusing them together. This primary preform can then be drawn into a fibre, using the same type of fibre-drawing tower that is used to draw standard fibre from a standard-fibre preform. The primary preform can, for example, be formed from fused silica elements with a diameter of about 0.8 mm.

Instead of being drawn directly into fibre, the primary preform can instead be drawn into a secondary preform with a width that is intermediate between those of the primary preform and the intended final fibre. The secondary preform can then itself be further drawn down to form the final fibre. Clearly, further intermediate steps can be introduced if needed. Provision of a secondary preform step can make the fibre fabrication process more reliable and productive. It also permits the fabricator to modify the structure at the secondary preform stage. For example, a solid silica jacket can be introduced when the secondary preform is drawn.

The PCF has a number of technologically significant properties, including (not necessarily simultaneously): endlessly single-mode guidance over a very broad range of wavelengths [T. A. Birks et al., Optics Letters v. 22 p. 961], a large mode area to carry high optical powers [J. C. Knight et al., Electronics Letters v. 34 p. 1347], a wide range of dispersion characteristics [A. Ferrando et al., Electronics Letters v. 35 p. 325], high optical nonlinearity [J. K. Ranka et al., Optics Letters v. 25 p. 25], guidance in multiple cores that may or may not interact [B. J. Mangan et al., Electronics Letters v. 36 p. 1358], and guidance in air or vacuum in a hollow core [R. F. Cregan et al., Science v. 285 p. 1537].

Exploitation of the properties of PCFs would be facilitated by simple and effective means to couple light into and out from these fibres. In particular, it would be of great benefit to make PCFs directly compatible with existing standard fibres. Unfortunately, some of the techniques of conventional fibre optics are not readily applicable to PCFs. For example, an incautious attempt to fusion-splice a PCF to a standard fibre can cause the air inside the PCF to expand explosively, destroying the joint. If the optical modes of the fibres being joined are not well-matched in size, even a careful joint will be highly lossy. Furthermore, the problem of pig-tailing more than one input or output fibre has always proved to be a major impediment to the exploitation of multiple-core fibres (both of PCF or standard design).

Tapering techniques involving heat treatment of fibres after they are fabricated can solve some of these problems. For example, heating and stretching of a fibre can be used to yield a low-loss transition that transforms the size of the guided mode of a PCF [International Patent Application No. PCT/GB/00599, published as WO 00/49435] but the match with a standard fibre will be at best approximate. Alternatively, a special PCF can be made that has a high-index core that guides light conventionally and is otherwise matched to a standard fibre [J. K. Chandalia et al., IEEE Photonics Technology Letters vol. 13 p. 52]; there are also large air holes in the fibre cladding so that, when the fibre is drawn down, the result is a PCF-like structure. However, the holes in the standard-fibre end of this structure can cause difficulties during fusion-splicing, and there is no benefit at all when trying to interface with multiple-core PCFs. Hence a method of pig-tailing a PCF with standard fibres, such that each core of the PCF has a low-loss optical transition to its own standard fibre, would be of great utility.

An object of the invention is to provide a method of joining fibres that overcomes the disadvantages of prior art methods and an optical waveguide comprising joined fibres.

According to the invention there is provided a method of joining a first optical fibre to a second optical fibre, the method comprising the steps of: (i) providing a preform element comprising material defining a primary elongate cavity; (ii) inserting the first optical fibre into the primary cavity to form a preform; and (iii) drawing the second optical fibre from the preform; wherein, the second optical fibre includes a core region comprising material that has been drawn from the first optical fibre.

The primary elongate cavity may communicate with a face of the preform. The primary elongate cavity may communicate with opposite faces of the preform. Preferably, the material of which the preform element is comprised is a glass, such as fused silica. The preform element may be made from substantially a single material. Preferably, the material of which the preform element is comprised is the same as a cladding material of the first optical fibre.

The material of which the preform element is comprised may be undoped. Alternatively, the material of which the preform element is comprised may be doped; possible dopants include germanium or a rare-earth dopant. Preferably, at least one dopant species is concentrated in isolated regions of the cross-section of the preform element (that is, regions that are not directly connected to each other). Preferably, each such region is no greater in area than four times the cross-sectional area of the first fibre. Preferably, the dopants raise the refractive index of the material in which they are incorporated. Preferably, a wave-guiding core is formed in the second fibre from the material having the raised refractive index.

Alternatively, at least one dopant species is present throughout the material of which the preform element is comprised except in isolated parts of the cross-section. Preferably, each such part is no greater in area than four times the area of the first fibre. Preferably, the dopants lower the refractive index of the material in which they are incorporated. Preferably, a wave-guiding core is formed in the second fibre from the material not having the lowered refractive index.

Preferably, the primary cavity has a substantially circular cross-section. Preferably, the primary cavity has a smallest transverse dimension of at least 100 microns. Larger dimensions may be advantageous; for example possible lower limits include 125 microns, 150 microns, 200 microns, 300 microns or 500 microns.

Thus, the cavity may be large enough to accept more than one first fibre at once. Preferably, a plurality of first optical fibres are inserted into the primary cavity. The plurality of first fibres may then be incorporated into a single core of the second fibre. The second fibre may then perform the functions of a fused fibre coupler since the second fibre resembles such a coupler with silica supports.

The preform element may have a plurality of primary cavities into each of which a first optical fibre is inserted. The preform element may thus incorporate more than one hole large enough to accept a fibre, and so provide an interface between more than one fibre and the cores of a multiple-core second fibre, such as a multi-core PCF. Such an interface is particularly difficult to achieve otherwise.

The preform element may include a secondary elongate cavity that does not receive an optical fibre. The secondary elongate cavity may communicate with a face of the preform. The secondary elongate cavity may communicate with opposite faces of the preform. Preferably, the secondary cavity has a cross-sectional area smaller than that of any cavity in which an optical fibre is received. Preferably, the secondary cavity has a substantially circular cross-section. Preferably, the secondary cavity is at most 500 microns in its largest transverse dimension. Smaller dimensions may be advantageous; for example, possible upper limits include 300 microns, 200 microns, 150 microns, 100 microns, 80 microns, 50 microns, 30 microns or 20 microns.

Preferably, there are at least two secondary cavities. More secondary cavities may be advantageous; for example, possible lower limits on the number of such cavities include 3, 4, 6, 12 and 18.

Preferably, a hole in the second fibre is formed from the secondary elongate cavity.

Preferably, the secondary cavities are arranged around the primary cavities in the preform element transverse cross-section. Preferably, the secondary cavities are arranged in a periodic pattern.

Preferably, the preform element, together with one or more first fibres arranged in one or more primary cavities is substantially a large-scale replica of a functioning photonic crystal fibre. Of course, in determining whether or not a particular preform is such a replica, one may need to allow for such changes in the relative sizes and shapes of the cavities as can take place during fibre drawing where the cavities can be subject to different air pressures. Photonic crystal fibres may be arranged to have many useful properties; for example, a photonic crystal fibre may be an endlessly single-mode fibre a multiple core fibre, a dispersion modified fibre, a large mode area fibre, a highly nonlinear fibre, or a hollow-core fibre.

The preform element and the first fibre may thus form a photonic-crystal-fibre preform. When that preform is drawn down in size the resulting reduced structure is a PCF, within which the entire original fibre forms part of a waveguiding core. If the transition between the original fibre and the PCF satisfies the well-known criterion for adiabaticity in fibre transitions, light can propagate efficiently between the original fibre core and the core of the PCF. The criterion for adiabaticity (described to various approximations in J. D. Love et al., Electronic Letters vol. 22 p. 912 and J. D. Love et al., IEEE Proceedings J vol. 138 p. 343) defines the maximum rate of change of a waveguide transition, along the length of the waveguide, that preserves low-loss propagation; that maximum can be calculated using numerical techniques well-known to those skilled in the art. The transition can therefore be a low-loss interface between fibres such as the original fibre and other fibres such as the PCF.

A photonic crystal fibre may have a cladding comprising an array of solid, elongate cylinders embedded in a matrix material, rather than an array of holes. The preform element may thus comprise a plurality of solid, elongate cylinders, which are drawn to form part of a cladding region of the second fibre.

The first fibre may be a standard fibre. Alternatively, it may be a PCF. The photonic crystal fibre may include at least one core that does not incorporate a first fibre.

Preferably, the preform element is formed by stacking a plurality of elements. Preferably, at least some of the elements are glass tubes and/or rods. More preferably, all of the elements are glass tubes and/or rods. At least one of the elements may itself be formed from a plurality of glass tubes and/or rods. Preferably, the elements have a substantially circular outer cross-section. More preferably the elements have substantially the same outer diameter. Preferably, the elements are fused together. Preferably, the stack is assembled on a larger scale and then drawn down in size to form the desired preform element.

Preferably, the primary elongate cavity is formed by omitting at least one element from the stack. Alternatively, the primary cavity may be formed from the bore of a tubular element in the stack. Preferably, the tubular element from which the primary cavity is formed has a larger bore than that of any tubular element not forming another primary cavity. Preferably, the tubular element from which the primary cavity is formed has a larger outer diameter than that of any tubular element not forming another primary cavity.

The primary cavity may be an interstitial cavity between adjacent elements. The secondary cavity may be formed from the bore of a tubular element in the stack. Alternatively, the secondary cavity may be an interstitial hole between adjacent elements.

Alternatively, the preform element may be formed by extrusion. Alternatively, the preform element may be formed by casting of sol-gel material.

Preferably, the preform element is enclosed in an outer jacket.

Preferably, the second fibre is drawn in a fibre drawing tower. Preferably, the drawing of the second fibre proceeds in the same way as the fabrication of a photonic crystal fibre from a preform. The lower drop-off portion of the combination may be retained so as to form a double-ended device.

Alternatively, the second fibre may be drawn in a fibre-tapering rig. Drawing using a fibre-tapering rig would yield a double-ended structure. Such a double-ended structure may be cleaved to form two single-ended structures.

Preferably, a hole is prevented from forming in the second fibre by maintaining differential gas pressures in holes during drawing. Thus, if there is excess space in the primary cavity even when the first fibre is inserted, the excess space may be eliminated, as the fibre is drawn, by using differential pressure to collapse the preform element around the standard fibre. Similarly, there may be excess space between the preform element and the outer jacket. Similarly, there may be an interstitial hole, between the stacked elements from which the preform element is formed, that would otherwise form a hole in the second fibre.

Preferably, the size of the hole, in the second fibre, formed from the secondary cavity is controlled by differential gas pressure. For example, collapse of the hole may be prevented by differential gas pressure or the size of the hole relative to the rest of the preform may be maintained or increased during drawing by differential gas pressure. The differential gas pressure may be provided by partial evacuation of at least one elongate cavity. The differential gas pressure may be provided by compression of gas within at least one elongate cavity.

An example of a useful embodiment of the invention is a form of 'null coupler' (see T. A. Birks et al., Opt. Lett. vol. 19, pp 1964–1966 (1994)). A prior-art null coupler is made by fusing two fibres together to form a tapered, fused region. However, the fibres fused to form a null coupler are sufficiently dissimilar that substantially no light is, in fact, coupled between them. Rather, each fibre cleanly excites a single transverse mode of the coupler waist (typically, the fundamental mode and one or more higher order mode). Null couplers made from more than two fibres thus enable excitation of more than one higher-order mode, as each fibre included in the coupler excites a different transverse mode (although symmetry considerations prevent excitation of some higher-order modes).

Null couplers can be employed in a number of ways, for example as polarisers (T. A. Birks et al., Opt. Lett. vol. 20, no. 12, pp. 1371–1373 (1995)), switches (T. A. Birks et al., Opt. Lett. vol. 21, no. 10, pp. 722–724 (1996)) or mode converters. A mode converter is made from a null coupler by cleaving the coupler at its waist (where the higher-order mode or modes are excited). However, cleaving at the waist results in a thin end-portion of fibre, which is sensitive to external disturbances (as light is guided on the fibre's outer surface) and therefore is not easily handled. Furthermore, the thinness of the end-portion results in it being susceptible to displacements by air-currents, making handling still harder.

A method also according to the invention provides an improved method of making a mode converter similar to the converter based on a null coupler. Thus, a core may be provided in the preform, the core having a diameter sufficiently different from the diameter of the core of the first optical fibre that substantially no light is coupled between them, the core, the first optical fibre and the preform being arranged such that light propagating in the first optical fibre will excite a higher-order mode in the second optical fibre. In a null coupler, at least two fibres cores are needed to provide a route into a higher-order mode of the waist from at least one of them, since one fibre provides a route into the fundamental mode of the waist. However, it is not necessary to access one of the cores in mode-converter operation and thus a 'fibre' in the form of a dummy core may be built into the preform. Thus, the core may be provided as a dummy core in the preform. Alternatively, the core may be provided in a third optical fibre inserted into a cavity in the preform. Features of the fibre and core necessary to achieve excitation of the desired higher-order mode can readily be determined by a person skilled in the art; for example, an appropriate core size may readily be calculated for a given core size in the second (i.e., the drawn) fibre.

Preferably, a plurality of fibres are inserted into the primary cavity, the fibres being such that each fibre excites a different higher-order mode in the drawn fibre.

It may be that one or more fibres are inserted into a further cavity in the preform element; thus, the fibre or fibres in the primary cavity may excite a first set of one or more higher-order modes and the fibre or fibres in the further cavity may excite a second set of one or more different higher-order modes. Of course, there may be still further cavities containing still further fibres.

Thus, the preform element may provide mechanical stiffness and optical isolation from the environment for the coupler.

An example of a possible application for a mode converter according to the invention can readily be appreciated from, for example, A. H. Gnauck et al., Electron. Lett. Vol. 36, No. 23, pp 1946–1947 (2000), who describe use of a mode converter to compensate dispersion and dispersion slope of a telecomms optical fibre.

Also according to the invention there is provided an optical device comprising a first optical fibre and a second optical fibre having a core region and a cladding region, wherein the core region of the second optical fibre comprises material that has been drawn from the first optical fibre.

Such a structure differs from the structure of J. K. Chandalia et al., IEEE Photonics Technology Letters vol. 13 p. 52, in that whereas the former is a standard fibre at one end, the latter merely resembles one at its centre but must still have air holes in the cladding. Furthermore, the latter retains grave problems of location and splicing when interfacing with PCFs with more than one core.

Preferably, there is a gradual transition from the first fibre to the second fibre. Preferably, the transition shape is gradual enough to satisfy the criterion for adiabaticity, such that the transformation device carries light between the first fibre and the second fibre with less than 3 dB of loss. Lower losses are more desirable; for example, possible upper limits for the loss include 1 dB, 0.5 dB, 0.2 dB, or 0.1 dB.

Preferably, the device includes a length of preform between the first optical fibre and the second optical fibre. Preferably, transitions to a preform having a first fibre exist at both ends of the second fibre.

Preferably, the core region of the second fibre is the first fibre with reduced size. The second fibre may be a standard fibre. Preferably, the second fibre includes at least one elongate hole. Preferably, the second fibre is a photonic-crystal fibre. Preferably, the second fibre incorporates a second core that does not incorporate a first fibre. Preferably, the second core incorporates dopants, such as germanium or a rare-earth dopant. The second core may be hollow.

Preferably, the second fibre includes a jacket region; preferably, the jacket region forms an integral part of the second fibre, with no gap between it and the rest of the second fibre.

Preferably, the first fibre forms an integral part of the second fibre, with no gap between it and the rest of the second fibre.

The second fibre may have particular properties; for example, it may be an endlessly single-mode fibre, a multiple core fibre, a dispersion modified fibre, a large mode area fibre a highly nonlinear fibre or a hollow core fibre.

Preferably, the first fibre is a standard fibre. The standard fibre may be a single-mode fibre. The standard fibre may be made from fused silica. The standard fibre may be a telecommunications fibre. The standard fibre may have a plurality of cores. The standard fibre may a polarisation-maintaining fibre. The standard fibre may incorporate rare-earth dopants.

Alternatively, the first fibre may be a photonic crystal fibre.

The optical device may comprise a third optical fibre. The core region of the second optical fibre may include material drawn from the third optical fibre. The second optical fibre may include a second core region containing material drawn from the third optical fibre. Thus, there may be a plurality of fibres more than one of which leads to the core region of the second fibre. Each of that plurality of fibres may lead to the core region of the second fibre. There may be a plurality of fibres more than one of which leads to a separate respective core in the second fibre. Each of that plurality of further fibres may lead to a separate respective core in the second fibre.

Of course, the optical device may have other features corresponding to features described above with reference to the method according to the invention.

Preferably, the optical device comprises a further core, the further core having a diameter sufficiently different from the diameter of the core of the first optical fibre that the cores couple into different transverse modes of the second optical fibre, wherein the first optical fibre, the further core and the second optical fibre are arranged such that light propagating in the first optical fibre excites a higher-order mode in the second optical fibre.

Preferably, the optical device comprises a further optical fibre, arranged such that light propagating in the further optical fibre excites a second, different, higher-order mode in the second optical fibre.

Thus, also according to the invention there is provided a mode converter comprising an optical device as described above as being according to the invention. Possible arrangements for the mode converter are discussed above in relation to aspects of the method according to the invention.

Also according to the invention, there is provided an optical fibre transformation device, comprising a length of a preform including a length of a first fibre inside a first hole, the other end comprising a second fibre that is a photonic crystal fibre, and a gradual transition from one structure to the other in between. The length of preform may have been partially drawn.

Also according to the invention there is provided a preform element comprising a primary elongate cavity large enough to receive a first optical fibre and a secondary elongate cavity, such that, when an assembly of the preform element and a first optical fibre is drawn down in size a second optical fibre is formed, the second fibre being a photonic crystal fibre with a core incorporating the first fibre and a cladding incorporating the secondary elongate cavity.

An embodiment of the invention will now be described, by way of example only, with reference to the drawings, of which.

Preform element 10 (FIG. 1) is cylindrical and comprises matrix material 30, which defines an array of secondary elongate cavities in the form of elongate, circular holes 20, arranged on a triangular lattice and extending along the longitudinal axis of the cylinder. At the centre of the preform element 10, the matrix material 30 defines a primary elongate cavity in the form of a further elongate hole 40 of diameter 150 microns (dimensioned to receive an optical fibre). The preform element functions as a form of "ferrule", enabling two optical fibres to be linked.

Figure 2:
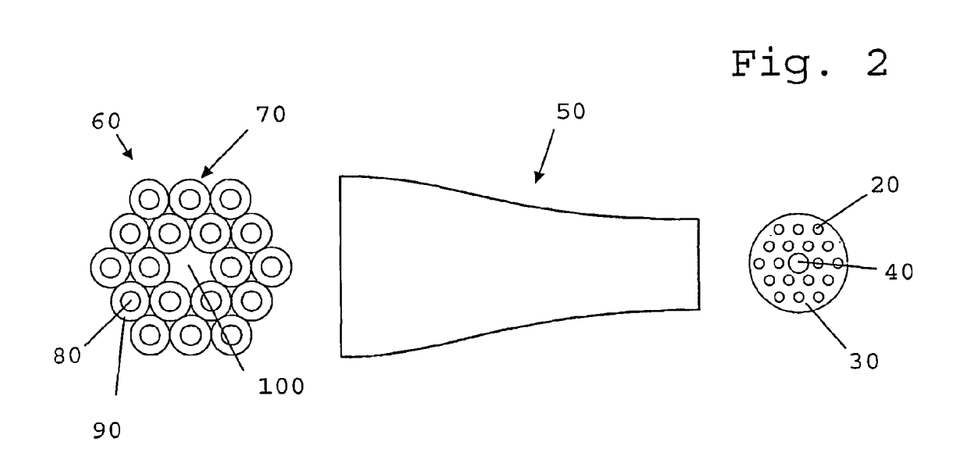
FIG. 2 shows the preform element of FIG. 1 partially drawn from a bundle of capillaries.

The preform element 10 is made by stacking an array of fused silica tubes 70 of diameter 0.8 mm (FIG. 2). Each tube comprises a cylindrical, silica outer portion 90 that defines an elongate hole 80. The stack 60 forms a hexagonal pattern with five tubes 70 along each side of the hexagon (only three are shown in FIG. 2 for ease of illustration). However, there is no tube 70 at the centre of the stack 60 but instead the innermost tubes 60 define a central hole 100. The stack 60 is drawn down, in a manner well known in the art, in a fibre drawing tower to fuse the tubes together and produce preform element 10 (FIG. 2 shows preform element 10 partially drawn from stack 60). To prevent any of the inner six tubes 60 moving into the central hole 100, spacers can be used, as described in International Patent Application No. PCT/GB00/01249, published as WO 00/60388.

Figure 1:
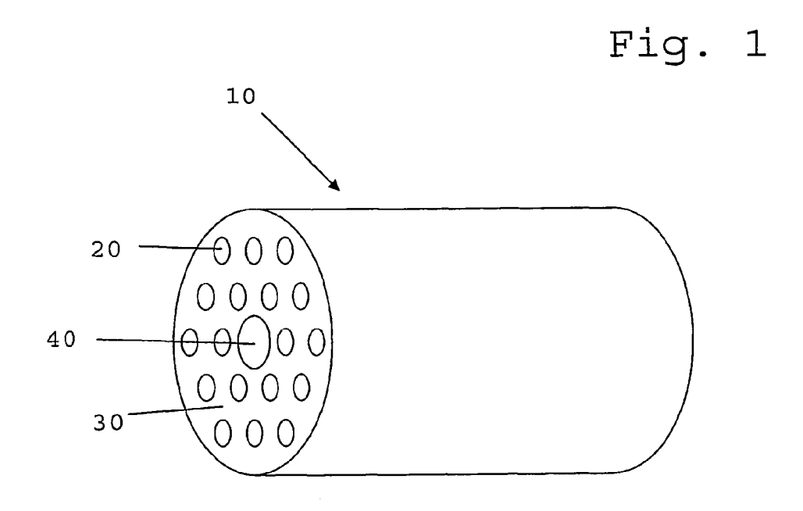
FIG. 1 shows a preform element for use in a method according to the invention.

Thus matrix regions 30 in the preform element 10 are formed from outer portions 90 in the stack 60; similarly, holes 20 are formed from holes 90 and central hole 40 is formed from central hole 100.

Figure 3:
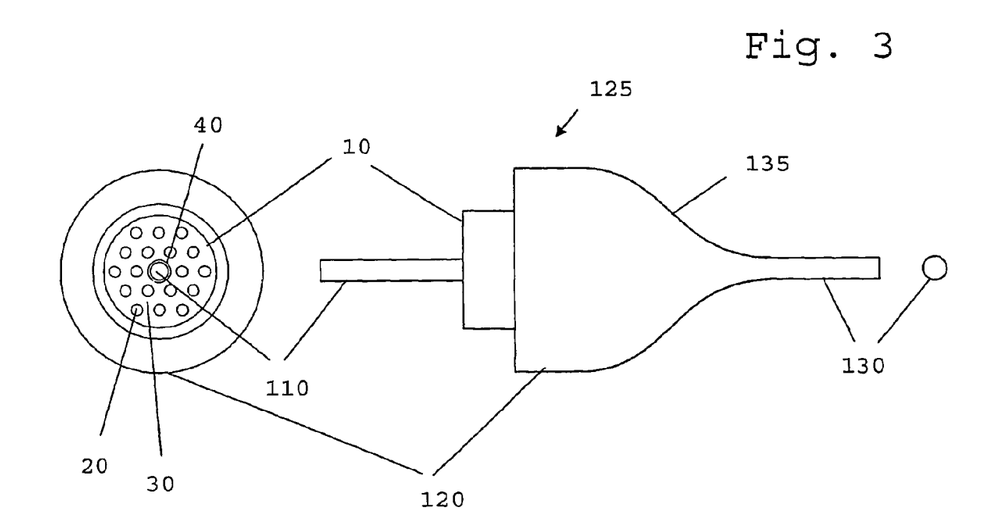
FIG. 3 shows an optical device according to the invention partially drawn from the preform element of FIG. 1.
Figure 4:
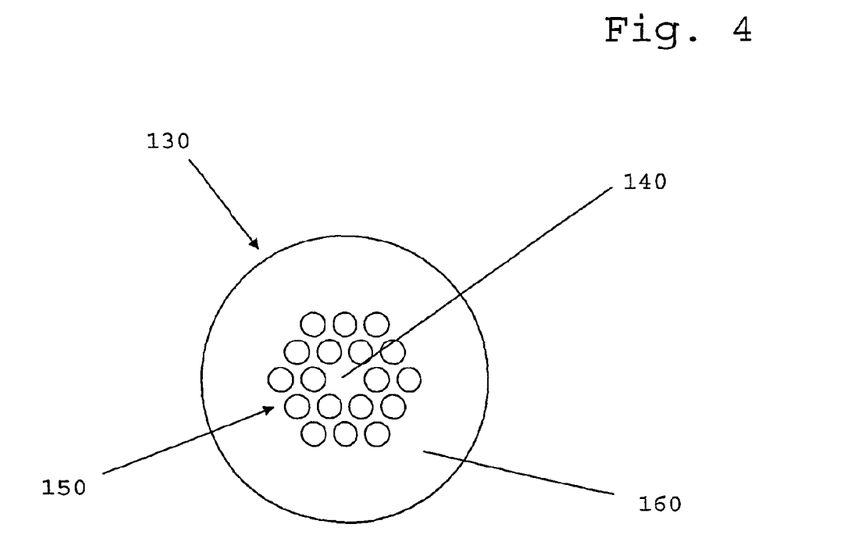
FIG. 4 shows an end view of a photonic crystal fibre forming part of the device of FIG. 3.

A standard single-mode fibre 110 is stripped of its polymer coating, thoroughly cleaned, and inserted into the central hole 40 of the preform element 10 (FIG. 3). Additionally, for convenience, a solid silica outer tube 120 is positioned around the preform element 10. Preform 125, formed of the fibre 110, the preform element 10 and the jacket 120, is then drawn into fibre 130 using a drawing tower, in a manner well known in the art. Standard fibre 110 does not fit tightly in central hole 40 and, similarly, preform element 10 does not fit tightly in outer tube 120. The pressures in the spaces formed around the fibre 110 and the preform element 10 are reduced in pressure using a vacuum pump and a suitable gas-tight fitting at the top end of the preform element 10 (that is, the end uppermost in the drawing tower, corresponding to the left-hand end of the device as shown in FIG. 3). Two unwanted gaps are thus not formed in the final fibre 130. Partial evacuation of the spaces also helps to prevent holes 80 (which are not depressurised) from collapsing themselves. Of course, such a method of evacuating a space between an outer tube and an inner element is of general application in PCF manufacture and may be useful in arrangements other than that described here. It provides a convenient method of removing unwanted gaps and/or preventing the collapse of (wanted) holes during drawing.

The drawing process is stopped before all of the preform 125 is drawn out and the remaining preform 125 is removed from the drawing tower. As shown in FIG. 3, it has a tapered region 135 that was inside the furnace and some of the drawn fibre 130 still attached. Such a tapered structure provides a low-loss transition between the original standard fibre 110, emerging from the end of the preform element 10, and a fibre 130 that is optically indistinguishable from a PCF made by techniques of the prior art.

Figure 5:
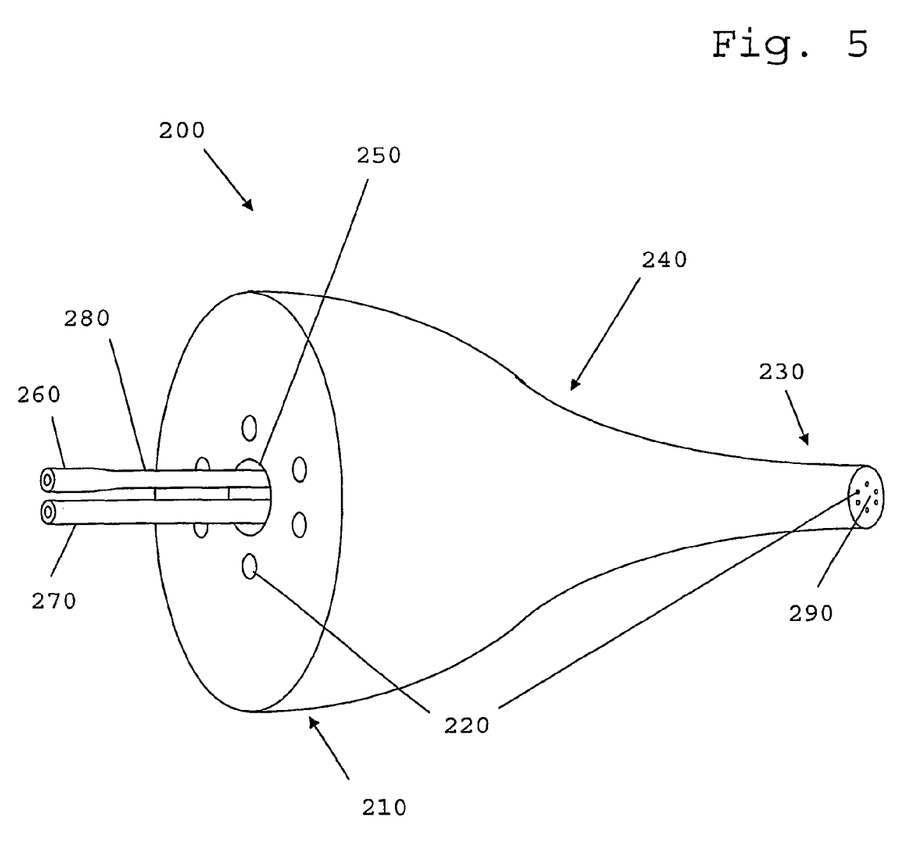
FIG. 5 shows a partially drawn preform for forming a mode-coupler according to the invention.

An example of an optical device that can be made according to the invention is a mode coupler 200 (FIG. 5).

Two standard single-mode fibres 260, 270 (of diameter 125 microns) are provided. A length 280 of fibre 260 has been pre-tapered (that is, narrowed in diameter in a tapering rig beforehand) to a diameter of 90 microns. Fibre 270 and part of length 280 of fibre 260 are inserted into a central hole 250 in a ferrule 210, the hole 250 being big enough to pass both fibres. Ferrule 210 also includes an array of holes 220, arranged to provide guidance to light in core 290 of drawn portion 230 (only six such holes are shown in FIG. 5, for ease of illustration).

The ferrule 210 and fibres 260, 270 are drawn down on a tapering rig or on a drawing tower to reduce the diameter of ferrule 210 by a factor of 30. Core 290 of the drawn fibre thus contains material drawn from fibres 260, 270. The drawing is sufficiently gradual that the transition 240 between narrowed region 230 and untapered region 210 is adiabatic. The narrowed region 230 is then cleaved.

Light entering the unpretapered fibre 270 emerges at the cleaved endface in the fundamental mode of narrowed section 230, while light entering the pretapered fibre 260 emerges in the $LP_{11}$ (second-order) mode of the narrowed section 230.

The invention claimed is:

1. An optical fibre transformation device, comprising at one end a length of a preform element including a length of a first fibre inside a first hole, the other end comprising a second fibre that is a photonic crystal fibre, and a gradual transition from the first fiber to the second fiber.

2. A preform element comprising a primary elongate cavity large enough to receive a first optical fibre and a secondary elongate cavity, such that, when an assembly of the preform element and a first optical fibre is drawn down in size a second optical fibre is formed, the second fibre being a photonic crystal fibre with a core incorporating the first fibre and a cladding incorporating the secondary elongate cavity.

3. A method of joining a first optical fibre to a second optical fibre, the method comprising the steps of: (i) providing a preform element comprising material defining a primary elongate cavity; (ii) inserting the first optical fibre into the primary cavity to form a preform; and (iii) drawing the second optical fibre from the preform; wherein, the second optical fibre includes a core region comprising material that has been drawn from the first optical fibre, in which the preform includes a secondary elongate cavity that does not receive an optical fibre.

4. The method as claimed in claim 3, in which the primary cavity has a smallest transverse dimension of at least 100 microns.

5. The method as claimed in claim 3, in which a plurality of first optical fibres are inserted into the primary cavity.

6. The method as claimed in claim 3, in which the preform element has a plurality of primary cavities into each of which a first optical fibre is inserted.

7. The method as claimed in claim 3, in which the secondary cavity has a cross-sectional area smaller than that of any cavity in which an optical fibre is received.

8. The method as claimed in claim 3, in which the secondary cavity is at most 500 microns in its largest transverse dimension.

9. The method as claimed in claim 3, in which a hole in the second fibre is formed from the secondary elongate cavity.

10. The method as claimed in claim 9, in which the size of the hole, in the second fibre, formed from the secondary cavity is controlled by differential gas pressure.

11. The method as claimed in claim 3, in which there are at least two secondary cavities.

12. The method as claimed in claim 11, in which the secondary cavities are arranged around the primary cavities in the preform element transverse cross-section.

13. The method as claimed in claim 11, in which the secondary cavities are arranged in a periodic pattern.

14. The method as claimed in claim 3, in which the preform element comprises a plurality of solid, elongate cylinders, which are drawn to form part of a cladding region of the second fibre.

15. The method as claimed claim 3, in which the preform element is formed by stacking a plurality of elements.

16. The method as claimed in claim 3, in which the first fibre is a standard fibre.

17. The method as claimed in claim 3, in which the first fibre is a photonic crystal fibre.

18. The method as claimed in claim 3, in which the second fibre is drawn in a fibre-tapering rig.

19. The method as claimed in claim 3, in which a hole is prevented from forming in the second fibre by maintaining differential gas pressures in holes during drawing.

20. A method of joining a first optical fibre to a second optical fibre, the method comprising the steps of: (i) providing a preform element comprising material defining a primary elongate cavity; (ii) inserting the first optical fibre into the primary cavity to form a preform; and (iii) drawing the second optical fibre from the preform; wherein, the second optical fibre includes a core region comprising material that has been drawn from the first optical fibre, in which the preform element is formed by stacking a plurality of elements.

21. The method as claimed in claim 20, in which the primary cavity has a smallest transverse dimension of at least 100 microns.

22. The method as claimed in claim 20, in which a plurality of first optical fibres are inserted into the primary cavity.

23. The method as claimed in claim 20, in which the preform element has a plurality of primary cavities into each of which a first optical fibre is inserted.

24. The method as claimed in claim 20, in which the preform element comprises a plurality of solid, elongate cylinders, which are drawn to form part of a cladding region of the second fibre.

25. The method as claimed in claim 20, in which at least some of the elements are glass tubes and/or rods.

26. The method as claimed in claim 20, in which at least one of the elements may itself be formed from a plurality of glass tubes and/or rods.

27. The method as claimed in claim 20, in which the elements are fused together.

28. The method as claimed in claim 20, in which the stack is assembled on a larger scale and then drawn down in size to form the desired preform element.

29. The method as claimed in claim 20, in which the primary elongate cavity is formed by omitting at least one element from the stack.

30. The method as claimed in claim 20, in which the primary cavity is formed from the bore of a tubular element in the stack.

31. The method as claimed in claim 20, in which the first fibre is a standard fibre.

32. The method as claimed in claim 20, in which the first fibre is a photonic crystal fibre.

33. The method as claimed in claim 20, in which the second fibre is drawn in a fibre-tapering rig.

34. The method as claimed in claim 20, in which a hole is prevented from forming in the second fibre by maintaining differential gas pressures in holes during drawing.

35. A method of joining a first optical fibre to a second optical fibre, the method comprising the steps of: (i) providing a preform element comprising material defining a primary elongate cavity; (ii) inserting the first optical fibre into the primary cavity to form a preform; and (iii) drawing the second optical fibre from the preform; wherein, the second optical fibre includes a core region comprising material that has been drawn from the first optical fibre, in which the first fibre is a photonic crystal fibre.

36. The method as claimed in claim 35, in which the primary cavity has a smallest transverse dimension of at least 100 microns.

37. The method as claimed in claim 35, in which a plurality of first optical fibres are inserted into the primary cavity.

38. The method as claimed in claim 35, in which the preform element has a plurality of primary cavities into each of which a first optical fibre is inserted.

39. The method as claimed in claim 35, in which the preform element comprises a plurality of solid, elongate cylinders, which are drawn to form part of a cladding region of the second fibre.

40. The method as claimed in claim 35, in which the first fibre is a standard fibre.

41. The method as claimed in claim 35, in which the second fibre is drawn in a fibre-tapering rig.

42. The method as claimed in claim 35, in which a hole is prevented from forming in the second fibre by maintaining differential gas pressures in holes during drawing.

43. An optical device comprising a first optical fibre and a second optical fibre having a core region and a cladding region, wherein the core region of the second optical fibre comprises material that has been drawn from the first optical fibre, in which the second fibre is a photonic-crystal fibre.

44. An optical device as claimed in claim 43, in which there is a gradual transition from the first fibre to the second fibre.

45. An optical device as claimed in claim 44, in which the transition shape is gradual enough to satisfy the criterion for adiabaticity, such that the transformation device carries light between the first fibre and the second fibre with less than 3 dB of loss.

46. An optical device as claimed in claim 43, in which the device includes a length of preform element between the first optical fibre and the second optical fibre.

47. An optical device as claimed in claim 43, in which the second fibre includes at least one elongate hole.

48. An optical device as claimed in claim 43, in which the second fibre is a standard fibre.

49. An optical device as claimed in claim 43, in which the second core incorporates dopants.

50. An optical device as claimed in claim 43, in which the second fibre includes a jacket region.

51. An optical device as claimed in claim 43, in which the first fibre is a standard fibre.

52. An optical device as claimed in claim 43, in which the first fibre is a photonic crystal fibre.

53. An optical device as claimed in claim 43, comprising a third optical fibre.

54. An apical device as claimed in claim 53, in which the core region of the second optical fibre includes material drawn from the third optical fibre.

55. An optical device claimed in claim 53, in which the second optical fibre includes a second core region containing material drawn from the third optical fibre.

56. An optical device comprising a first optical fibre and a second optical fibre having a core region and a cladding region, wherein the core region of the second optical fibre comprises material that has been drawn from the first optical fibre, in which the first fibre is a photonic crystal fibre.

57. An optical device as claimed in claim 56, in which there is a gradual transition from the first fibre to the second fibre.

58. An optical device as claimed in claim 57, in which the transition shape is gradual enough to satisfy the criterion for adiabaticity, such that the transformation device carries light between the first fibre and the second fibre with less than 3 dB of loss.

59. An optical device as claimed in claim 56, in which the device includes a length of preform element between the first optical fibre and the second optical fibre.

60. An optical device as claimed in claim 56, in which the second fibre includes at least one elongate hole.

61. An optical device as claimed in claim 56, in which the second fibre is a standard fibre.

62. An optical device as claimed in claim 56, in which the second core incorporates dopants.

63. An optical device as claimed in claim 56, in which the second fibre includes a jacket region.

64. An optical device as claimed in claim 56, in which the first fibre is a standard fibre.

65. An optical device as claimed in claim 56, comprising a third optical fibre.

66. An optical device as claimed in claim 65, in which the core region of the second optical fibre includes material drawn from the third optical fibre.

67. An optical device as claimed in claim 65, in which the second optical fibre includes a second core region containing material drawn from the third optical fibre.

* * * * *